United States Patent
Happel et al.

(10) Patent No.: US 7,660,497 B2
(45) Date of Patent: Feb. 9, 2010

(54) APPARATUS FOR TRANSMITTING OPTICAL SIGNALS BETWEEN COMPONENTS WHICH CAN BE ROTATED RELATIVE TO ONE ANOTHER (ROTARY TRANSMITTER)

(75) Inventors: Tobias Happel, Berlin (DE); Stefan Nerreter, Heidesse OT Blossin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 12/491,446

(22) Filed: Jun. 25, 2009

(65) Prior Publication Data
US 2009/0324167 A1 Dec. 31, 2009

(30) Foreign Application Priority Data
Jun. 26, 2008 (DE) .................. 10 2008 030 187

(51) Int. Cl.
*G02B 6/26* (2006.01)
*G02B 6/42* (2006.01)
*G02B 6/00* (2006.01)
(52) U.S. Cl. ............................ 385/25; 385/26; 385/140
(58) Field of Classification Search ................... 385/25, 385/26, 140
See application file for complete search history.

(56) References Cited

U.S. PATENT DOCUMENTS

| 7,215,860 B2* | 5/2007 | Engelberth et al. ........... 385/127 |
| 7,551,828 B2* | 6/2009 | Shimada et al. .............. 385/140 |
| 2001/0038730 A1* | 11/2001 | Sorin et al. .................... 385/11 |

FOREIGN PATENT DOCUMENTS

| DE | 10050890 A1 | 4/2002 |
| DE | 10230481 A1 | 1/2004 |
| DE | 10353891 A1 | 6/2005 |
| EP | 0453233 A2 | 10/1991 |
| EP | 1476969 B1 | 7/2005 |

* cited by examiner

*Primary Examiner*—Frank G Font
*Assistant Examiner*—Mary A El Shammaa

(57) ABSTRACT

A rotary transmitter for transmitting optical signals between two components is described. In accordance with the invention, provision is made for a fiber optic cable, optionally also a second fiber optic cable to be used to transmit the signals, the latter being suited, due to their surface treatment, to coupling signals of send elements and forwarding them to an interface in order to be registered there by a receive element. The fiber optic cables are laid such that they describe a circle upon which the transmission elements rotate about an axis of rotation. As a result, a complete data transmission is possible by way of the waveguide. The components (send elements, receive elements and the optical fiber cables) can be fastened to an annular printed circuit board by SMT.

16 Claims, 2 Drawing Sheets

APPARATUS FOR TRANSMITTING OPTICAL SIGNALS BETWEEN COMPONENTS WHICH CAN BE ROTATED RELATIVE TO ONE ANOTHER (ROTARY TRANSMITTER)

CROSS REFERENCE TO RELATED APPLICATIONS

This application claims priority of German Patent Application No. 10 2008 030 187.6 DE filed Jun. 26, 2008, which is incorporated by reference herein in its entirety.

FIELD OF INVENTION

The invention relates to an apparatus for transmitting optical signals between two components, which can be rotated relative to one another in respect of an axis of rotation, comprising at least one optical send element, an optical receive element as well as a transmission element for optical signals, which can be coupled to the optical send element and the optical receive element such that a signal transmission is ensured irrespective of the angular position between the two components.

BACKGROUND OF INVENTION

An apparatus of the type mentioned in the introduction is described for instance in DE 100 50 890 A1. The optical send element is subsequently embodied as a so-called rotary transmitter, with it being possible to feed light, which emanates from a punctiform light source, into the end face of the annular transmitter (function dictates that the interior of the transmitter is reserved for other components). Light can thus be transmitted independently of the angular position of the rotary transmitter and thus of the components coupled to said rotary transmitter. The output of the punctiform light source can be dimensioned here such that adequate signal strength is available after distribution of the light signal in the annular rotary transmitter. This is also influenced inter alia by how precisely the light source can be aligned opposite to the rotary transmitter. A certain assembly outlay which is reflected in the manufacturing costs for the apparatus is associated herewith.

SUMMARY OF INVENTION

An object of the invention is to improve an apparatus of the type cited in the introduction such that comparatively cost-effective manufacturing of this apparatus is possible.

This object is achieved in accordance with the invention by the transmission element being formed by a waveguide which has the following properties. As an input interface for the transmission element, the waveguide has a section on the longitudinal side of the waveguide comprising a surface modification which increases the optical fiber attenuation. As an output interface for the receive element, the waveguide also has an end face side, which is suitably optimized in respect of the optical transmittability of signals by polishing for instance. The waveguide also follows a constant radius in respect of the axis of rotation of the relative rotation of the one or both components such that at least one send element is opposite the section irrespective of the angular position between the two components.

The inventive configuration of the transmission apparatus on the one hand advantageously allows the optical transmission of signals suited to high data rates to be realized. On the other hand, the relatively high costs resulting from the optical transmission are advantageously minimized by using comparatively cheap optical components and reducing the manufacturing and adjustment outlay. A fiber optic waveguide and light-emitting as well as photodiodes can be used as optical components for instance, which are low-cost items to purchase.

The receive interface opposite the send elements is preferably modified as a section in the cladding material of the fiber (i.e. the light-reflecting casing of the fiber core) with the aid of a laser structuring. The increase in optical fiber attenuation is used here so that in the section, light from the send elements can be coupled into the fiber. The increase in attenuation through the section is to be dimensioned here such that on the one hand light can be fed into the section but on the other hand a light transmission remains guaranteed within the fiber up to the end face on the output side. If the attenuation factor is namely selected too high, this means that the majority of the initially infed light is again coupled out of the fiber optic waveguide before reaching the end face side on the output side. In this respect, the length of the section is also limited by this requirement, since the attenuation with an excessively long section cannot be increased sufficiently in order to ensure a reliable coupling-in of the light from the send elements. These basic design rules for the section naturally do not only apply to the fiber optic waveguide, but instead also to any other waveguide. It is also conceivable for instance to manufacture an injection-molded waveguide as a molded part, which has precisely the dimensions of the rotary transmitter (i.e. the apparatus for transmitting the optical signals). This manufacturing method is particularly of interest in the case of large volumes because the section can also be integrated into the injection molded form as a zigzag profile, which renders a subsequent treatment of the waveguide superfluous.

According to one configuration of the invention, provision is made for the optical send element to be a surface-mount component and to be mounted on the front side of a printed circuit board with a radiating surface facing the front side. This printed circuit board is arranged at right angles to the axis of rotation and in the region of the radiating surface of the send element has an opening for the optical signals. The transmission element with the section is arranged in parallel to the rear of the printed circuit board such that the section is aligned with the opening. As the course of the section together with the optical fiber waveguide describes an arc, the send element thus passes over the section of the waveguide in the event of a relative movement between the components. The use of surface mounted components advantageously results in an additional cost reduction in terms of manufacture because the already mentioned conventional components of the send and receive elements can be mounted using SMD. The tolerances which are conventional in terms of electronics assembly and which are sufficient for the present application can be easily realized here. A complicated adjustment of the optical components in respect of each other is then simplified when assembling the apparatus on the relevant components, thereby advantageously reducing the assembly outlay.

It is advantageous for the waveguide to only extend across one part of the circumference of the circle described thereby and for so many send elements to be arranged such that they always face at least one section. As a result, a transmission of the optical signals is always ensured in a completely angle-independent fashion. Due to the already described connections between the necessary attenuation degree of the section, it is advantageous for the waveguide to be embodied shorter. The assembly is also simplified if the waveguide does not have to describe a complete circle. In order to increase the signal strength, so many send elements can be advantageously arranged such that two send elements always face the section. This is easily possible due to the use of relatively favorable components. The send elements must naturally also be arranged on an imaginary circle, which corresponds to the imaginary circle of the course of the waveguide in terms of radius.

According to a particular configuration of the apparatus according to the invention, provision is made for both a send element and also a receive element to be arranged in each instance on both components, with two waveguides accordingly also being provided. This is necessary since the waveguide ensures an optical transmittability only in one direction. This is due to it only being possible to feed light in via the section. If the waveguide was used in the other direction, the light on the section would be coupled out in a significantly scattered manner and may not be reliably registered by the receive element. The two fiber optic cables used therefore advantageously ensure a signal flow from the one component into the other as well as from the other component into the other. To this end, the send element of the one component is connected in each instance to the receive element of the other component by means of one of the two waveguides, with a signal flow in both directions being ensured as a result.

BRIEF DESCRIPTION OF THE DRAWINGS

Further details of the invention are described below with reference to the drawing. The same or corresponding drawing elements are provided in each instance with the same reference characters and are only explained in this respect repeatedly to determine how differences result between the individual figures, in which.

DETAILED DESCRIPTION OF INVENTION

Figure 1:
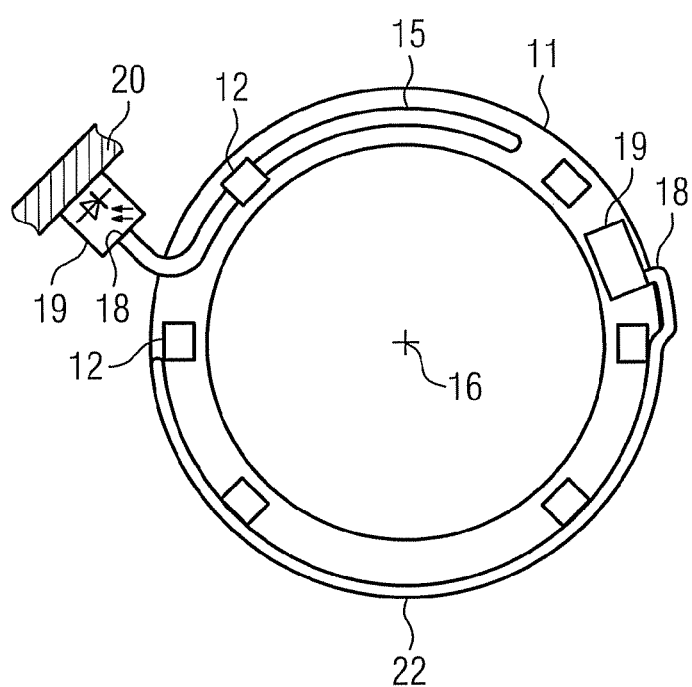
FIGS. 1 and 2 show the overhead view and the side view of an exemplary embodiment of the apparatus according to the invention.

According to FIG. 1, an annular printed circuit board 11 can be seen, on the circumference of which are fastened six send elements 12 using surface-mount technology (SMT). These are light-emitting diodes, the radiating surface of which is on the assembly side, as a result of which the printed circuit board has breakthroughs below the send elements (not visible in FIG. 1, but can however be inferred from the second printed circuit board 13 according to FIG. 2, where the opening 14 is visible below the relevant send element 12).

Although actually lying behind the printed circuit board 11, the course of a first waveguide 15 can be seen, which runs precisely on the circle described by the transmission elements when the first printed circuit board is rotated about an axis of rotation 16. A section, not shown in more detail, is present in this area (cf. 17 in FIG. 3), said section being available as the input interface for signals from the send elements 12. The front end face 18 of the first waveguide 15 is also connected to a receive element 19, which is formed by a photodiode and can thus convert a light signal into an electrical receive signal. The first waveguide 15 as well as the associated receive element 19 are in a fixed position, which can be formed for instance by a housing wall 20 of a machine tool. The first printed circuit board 11 can be fastened to a shaft (not shown) (cf. 21 in FIG. 2), which rotates about the axis of rotation 16. The relative movement between the shaft and the housing 20 arises as a result and renders the optical rotary transmitter necessary.

Figure 3:
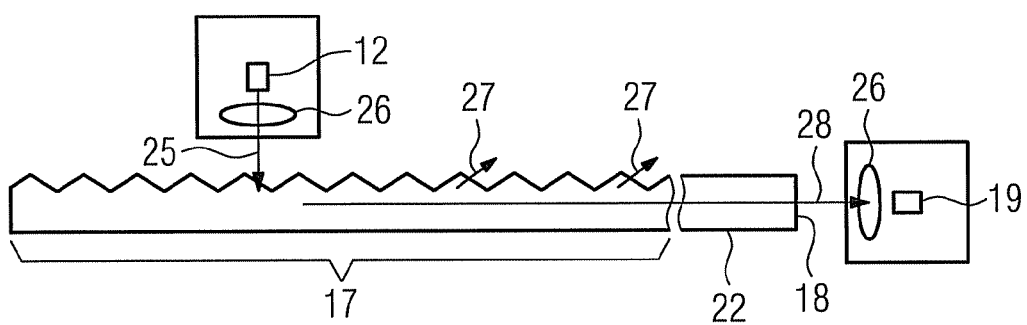
FIG. 3 shows a schematic representation of the transmission of signals in the fiber optic cable.

To also ensure a transmission of light signals in the opposite direction, a second waveguide 22 is located on the side of the first printed circuit board 11 facing away from the observer, said second waveguide, although not actually visible, still being shown in FIG. 1. This is likewise connected to a receive element 19, namely on the front end face 18 used as the output interface. A section configured according to the section 17 shown in FIG. 3 is likewise provided. The receive element 19 is attached to the side of the first printed circuit board turned towards the observer, as a result of which it can be manufactured in a manufacturing step with the send elements 12.

Figure 2:
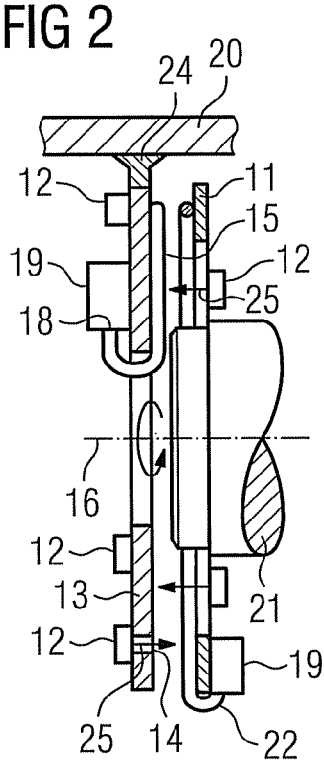

FIG. 2 reveals that a second printed circuit board 13 can also be used in order to fix the first waveguide 15, said second printed circuit board likewise being embodied in an annular fashion and being represented in section in FIG. 2. This is connected to the housing 20 by way of an attachment 24. In this respect, the side view according to FIG. 2 differs slightly from the overhead view according to FIG. 1, with the remaining elements corresponding to drawing elements.

Send elements 12 as well as a receive element 19 are assembled on the second printed circuit board in the manner described in FIG. 1 by means of surface-mount technology (SMT). The through-openings 14 lie opposite to the second waveguide 22, so that a light signal indicated by an arrow 25 can be coupled into the section of the second waveguide. It behaves identically to the light signal of the send element, which lies exactly opposite the section of the first waveguide 15.

FIG. 3 shows a schematic representation of the functionality of the inventive first and/or second waveguide 22. This has the section 17 of a certain length, with the remaining waveguide 22 not having undergone any surface treatment and thus only exhibiting minimal attenuation. In accordance with arrow 25, the light signal is fed and routed into the waveguide 22 by way of the send element 12 and possibly a collimating optics unit 26. A certain power loss can however be registered in the region of the section 17, shown by the arrows 27. The light signal appears on the front end face 18 as an output signal, shown by the arrow 28, from the waveguide, passes an additional collimating optics unit 26 and is registered by means of the receive element 19.

Figure 4:
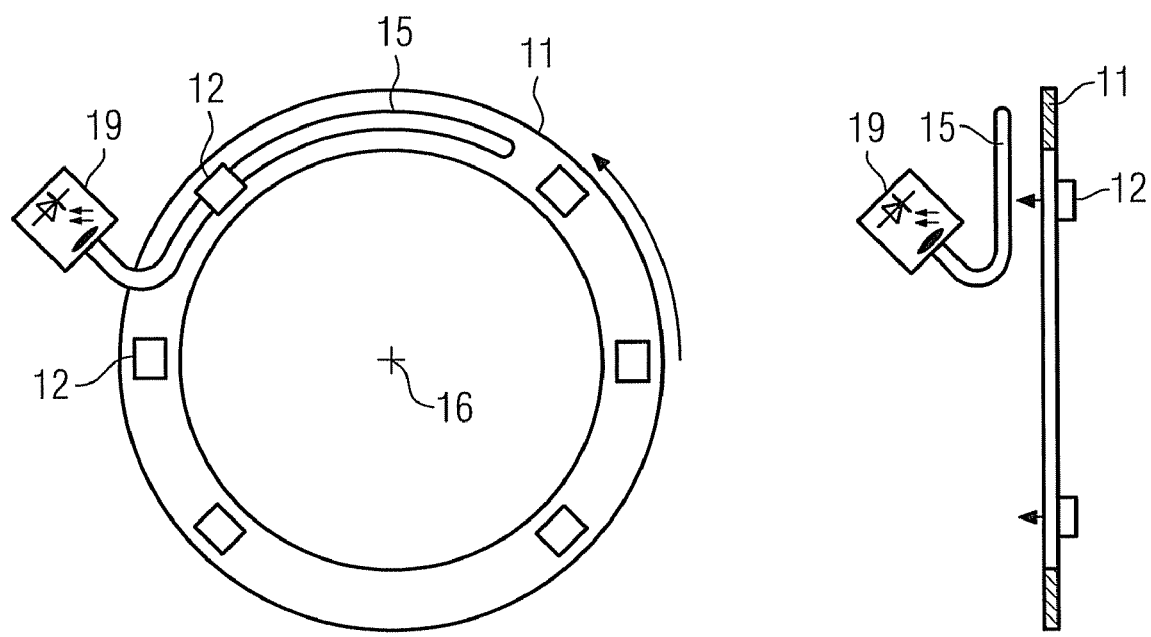
FIG. 4 shows a schematic representation of an overhead view and a side of a further exemplary embodiment of the apparatus according to the invention.

The representation according to FIG. 4 shows an additional exemplary embodiment of the apparatus according to the invention in a schematic view from above (view in an axial direction) and in a side view. This representation shows a plurality of send elements 12, which are positioned on a printed circuit board 11 for the send electronics system. The waveguide 15 (e.g. a fiber segment with a roughened surface) has the shape of an arc of a circle which is oriented toward the circular shape of the printed circuit board (PCB). The receive element 19 connects to the waveguide 15. The receive element 19 has an optical system.

The invention claimed is:
1. An apparatus for transmitting optical signals between two components, which can be rotated relative to one another in respect of an axis of rotation, comprising:
   an optical send element;
   an optical receive element; and
   a waveguide configured to transmit optical signals, the waveguide being coupled to the optical send element and the optical receive element such that a signal trans- mission is ensured irrespective of the angular position between the two components, wherein the waveguide includes a section on the longitudinal side of the waveguide as an input interface for the send element, the section including a surface modification which increases the optical fiber attenuation, wherein the waveguide provides a front end face as an output interface for the receive element, and wherein the waveguide follows a constant radius in respect of the axis of rotation such that the send element lies opposite the section irrespective of the angular position between the two components.

2. The apparatus as claimed in claim 1, further comprising: a printed circuit board, wherein the optical send element is embodied in SMT and is installed on a front side of the printed circuit board with a radiating surface facing the front side, wherein the printed circuit board is arranged at right angles to the axis of rotation, wherein the printed circuit board has an opening for the optical signals in the region of the radiating surface of the send element, and wherein the waveguide with the section is arranged in parallel to a rear of the printed circuit board such that the section is aligned with the opening.

3. The apparatus as claimed in claim 1, wherein the waveguide only extends across a part of a circumference of a circle described by the waveguide, and as many send elements are arranged for at least one to always lie opposite the segment.

4. The apparatus as claimed in claim 2, wherein the waveguide only extends across a part of a circumference of a circle described by the waveguide, and as many send elements are arranged for at least one to always lie opposite the segment.

5. The apparatus as claimed in claim 1, wherein each component includes a send element and a receive element, and wherein two waveguides are provided, the send element of the one component being connected to the receive element of the other component by one of the two waveguides.

6. The apparatus as claimed in claim 2, wherein each component includes a send element and a receive element, and wherein two waveguides are provided, the send element of the one component being connected to the receive element of the other component by one of the two waveguides.

7. The apparatus as claimed in claim 3, wherein each component includes a send element and a receive element, and wherein two waveguides are provided, the send element of the one component being connected to the receive element of the other component by one of the two waveguides.

8. The apparatus as claimed in claim 1, wherein the waveguide is a fiber optic waveguide.

9. The apparatus as claimed in claim 2, wherein the waveguide is a fiber optic waveguide.

10. The apparatus as claimed in claim 3, wherein the waveguide is a fiber optic waveguide.

11. The apparatus as claimed in claim 5, wherein the waveguide is a fiber optic waveguide.

12. The apparatus as claimed in claim 1, wherein the waveguide is manufactured as a transparent plastic injection-molded part.

13. The apparatus as claimed in claim 2, wherein the waveguide is manufactured as a transparent plastic injection-molded part.

14. The apparatus as claimed in claim 3, wherein the waveguide is manufactured as a transparent plastic injection-molded part.

15. The apparatus as claimed in claim 5, wherein the waveguide is manufactured as a transparent plastic injection-molded part.

16. The apparatus as claimed in claim 8, wherein the waveguide is manufactured as a transparent plastic injection-molded part.

* * * * *